(12) United States Patent
Inoue et al.

(10) Patent No.: US 6,536,738 B2
(45) Date of Patent: Mar. 25, 2003

(54) PINCH VALVE

(75) Inventors: Wataru Inoue, Nobeoka (JP); Shigenobu Furukawa, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 0 days.

(21) Appl. No.: 09/979,266
(22) PCT Filed: May 23, 2001
(86) PCT No.: PCT/JP01/04335
§ 371 (c)(1), (2), (4) Date: Nov. 21, 2001
(87) PCT Pub. No.: WO02/04849
PCT Pub. Date: Jan. 17, 2002

(65) Prior Publication Data
US 2002/0158217 A1 Oct. 31, 2002

(30) Foreign Application Priority Data
Oct. 2, 2000 (JP) ........................ 2000-302980
Sep. 12, 2000 (JP) ........................ 2000-277327
Jul. 7, 2000 (JP) ........................ 2000-207416

(51) Int. Cl.⁷ .................................................. F16K 7/07
(52) U.S. Cl. .............................................. 251/5; 251/7
(58) Field of Search ..................................... 251/5, 7

(56) References Cited
U.S. PATENT DOCUMENTS
2,588,212 A * 3/1952 Custer ..................... 251/5
4,322,054 A * 3/1982 Campbell .................. 251/7
4,339,897 A * 7/1982 Thompson et al. ........... 251/5
4,899,783 A * 2/1990 Yusko Jr. et al. ........... 251/5
5,316,261 A * 5/1994 Stoner ..................... 251/5

FOREIGN PATENT DOCUMENTS
| JP | 44-11585 | 5/1969 |
| JP | 45-3264 | 2/1970 |
| JP | 54-42016 Y2 | 12/1979 |
| JP | 60-9491 Y2 | 4/1985 |
| JP | 62-41474 A | 2/1987 |

* cited by examiner

Primary Examiner—Paul J. Hirsch
(74) Attorney, Agent, or Firm—Burns, Doane, Swecker & Mathis, L.L.P.

(57) ABSTRACT

A pinch valve includes a body containing an elastic tube, a cylinder body having a first cylinder portion at the upper interior part and a larger diameter second cylinder portion at the lower interior part, a first piston sliding on the inner periphery of the first cylinder portion, and a second piston sliding on the inner periphery of the second cylinder portion. The first piston is installed with a first interlocking rod having a first pressing piece at its lower end and the second piston is provided with second interlocking rods having a second pressing piece at their lower ends. The pressing pieces press the tube body from the upper and lower sides, a spring is disposed between the second piston and the first pressing piece, and an opening in the cylinder body communicates with a space enclosed by the pistons and the cylinder body.

12 Claims, 11 Drawing Sheets

PINCH VALVE

TECHNICAL FIELD

The present invention relates to a pinch valve used in a fluid transport pipeline in various industrial fields, such as chemical factories, semiconductor production, food processing, biotechnology or the like, and, more particularly, to a pinch valve which is compact and mitigates the damage of a tube body suffered during the opening and the closing of the valve.

BACKGROUND ART

Hitherto, various pinch valves have been proposed, and an example is disclosed in Japanese Examined Utility Model Publication No. 45-3264. According to this publication, as shown in FIGS. 11 and 12, in two upper and lower pistons 51, 52 fitted in a cylinder 50 on a leg member 49 constituted by a leg stand 47 and leg rods 48, the upper piston 51 is fixed to the upper end of a shaft rod 53 and the lower piston 52 is fixed to the upper end of a pipe shaft 54 loosely fitted on the shaft rod 53. On the lower portion of the pipe shaft 54 is provided a wing piece 55 which is fixed to a lower pressing piece 57 via connecting bars 56. On the other hand, an upper pressing piece 58 is fixed to the lower end of the shaft rod 53. Also, the center portion of a valve tube body 61 supported by the leg member 49 and two lateral rods 60 spanned between flanges 59 fitted on both ends of the valve tube body 61 is pressed by the upper and lower pressing pieces 58, 57, then the upper and lower pressing pieces 58, 57 connected to the pistons 51, 52 are symmetrically moved up and down by suitably forcing pressurized air into holes 62, 63, 64 pierced in the cylinder 50, so that the valve tube body 61 is opened and closed.

Now, at present, in an apparatus for manufacturing semiconductors in which various pipelines and control devices are arranged and complicated pipeline design is performed, allowing the apparatus per se to be compact has been required. As a result, a pinch valve used in the pipeline of the apparatus must be compact in order to save a space, and thus making the pinch valve compact in the apparatus is an important problem. Also, a pinch valve able to regulate a very small flow rate is required.

However, in the pinch valve described above, since the drive and the valve body are constituted as separate components, and the leg member 49, the leg stand 47 and the wing piece 55 are provided between the cylinder 50 and the valve tube body 61 which is a flow passage, the whole height of the valve is very large and thus the valve cannot be made compact. Consequently, the above pinch valve cannot be used as a pinch valve in the pipeline of the semiconductor manufacturing apparatus. Also, since, in such construction of the pinch valve, it is difficult to optionally adjust an opening degree of the valve tube body 61, the adjustment of a very small amount of flow rate cannot be performed.

DISCLOSURE OF THE INVENTION

The present invention has been conceived in view of the problems of the prior art as stated above and the purpose of this invention is to provide a pinch valve the whole height of which is low in comparison with the conventional pinch valve, which is compact and which remarkably mitigates the damage of the tube body suffered during the opening and the closing of the valve, and which is able to adjust a very small flow rate.

In order to achieve the above purpose, the constitution of the present invention is characterized in that it comprises a body containing an elastic tube body constituting a flow passage for a fluid, a cylinder body joined to the upper portion of the body at the lower end of the cylinder body and having a first cylinder portion at the upper portion of the interior of the cylinder body and a second cylinder portion having a diameter larger than that of the first cylinder portion at the lower portion of the interior of the cylinder body, a first piston sliding up and down on the inner periphery of the first cylinder portion, and a second piston sliding up and down on the inner periphery of the second cylinder portion, the first piston being provided with a first interlocking rod suspending from the center of the lower surface of the first piston, passing through the second piston and having a first pressing piece at the lower end of the first interlocking rod, the second piston being provided with second interlocking rods suspending from both ends of the lower surface of the second piston, passing through the first pressing piece and having a second pressing piece at the lower ends of the second interlocking rods, the first and second pressing pieces are arranged to clip the elastic tube body from the upper and lower sides, a spring elastic body urging the first pressing piece being arranged between the second piston and the first pressing piece, and an opening communicating with a space enclosed by the lower end surface of the first piston, the upper end surface of the second piston and the inner peripheral surface of the cylinder body being provided in the cylinder body.

In a preferred embodiment of the present invention, a pair of couplings are connected to both ends of the tube body, and a pair of cutouts receiving the pair of couplings are provided on the lower end portion of the cylinder body in the direction of the flow passage.

Also, the body is provided with a groove receiving the tube body and the couplings and with guide slots in which the second pressing piece is fitted to move up and down, at the location perpendicularly intersecting the groove. Further, the first pressing piece is provided with first through-holes through which the second interlocking rods penetrate at the symmetrical locations in relation to the axis of the flow passage, and the second piston is provided at the center portion thereof with a second through-hole on which the first interlocking rod slides in a sealing manner.

Also, in another embodiment, the upper surface of the cylinder body is provided with an opening portion, the upper portion of the first piston is integrally provided with a projecting male screw portion penetrating the opening portion of the cylinder body for adjusting the opening degree of the tube body, and a stopper pressed on and separated from the upper surface of the cylinder body and a lock-nut pressed on the upper surface of the stopper are rotatably screwed with the male screw portion for adjusting the opening degree of the tube body.

In addition, according to a further embodiment, the outer peripheral surface of the tube body is provided with a protecting portion.

Also, the dimension of the first pressing piece in the direction perpendicularly intersecting the axis of the flow passage is larger than that of the guide slot.

Further, the material of the tube body is EPDM, fluororubber, silicone rubber or a composition of these materials.

More preferably, the tube body is composed of a composition of tetrafluoroethylene and rubber elastic body.

Also, although the cylinder body, the opening degree adjusting male screw portion, the stopper, the lock nut and the body can be made of a material having rigidity, such as metal or plastic, and thus the materials of those components are not especially limited, a plastic such as PVC, PVDF or PFA is particularly preferable.

BEST MODE OF CARRYING OUT THE INVENTION

Figure 1:
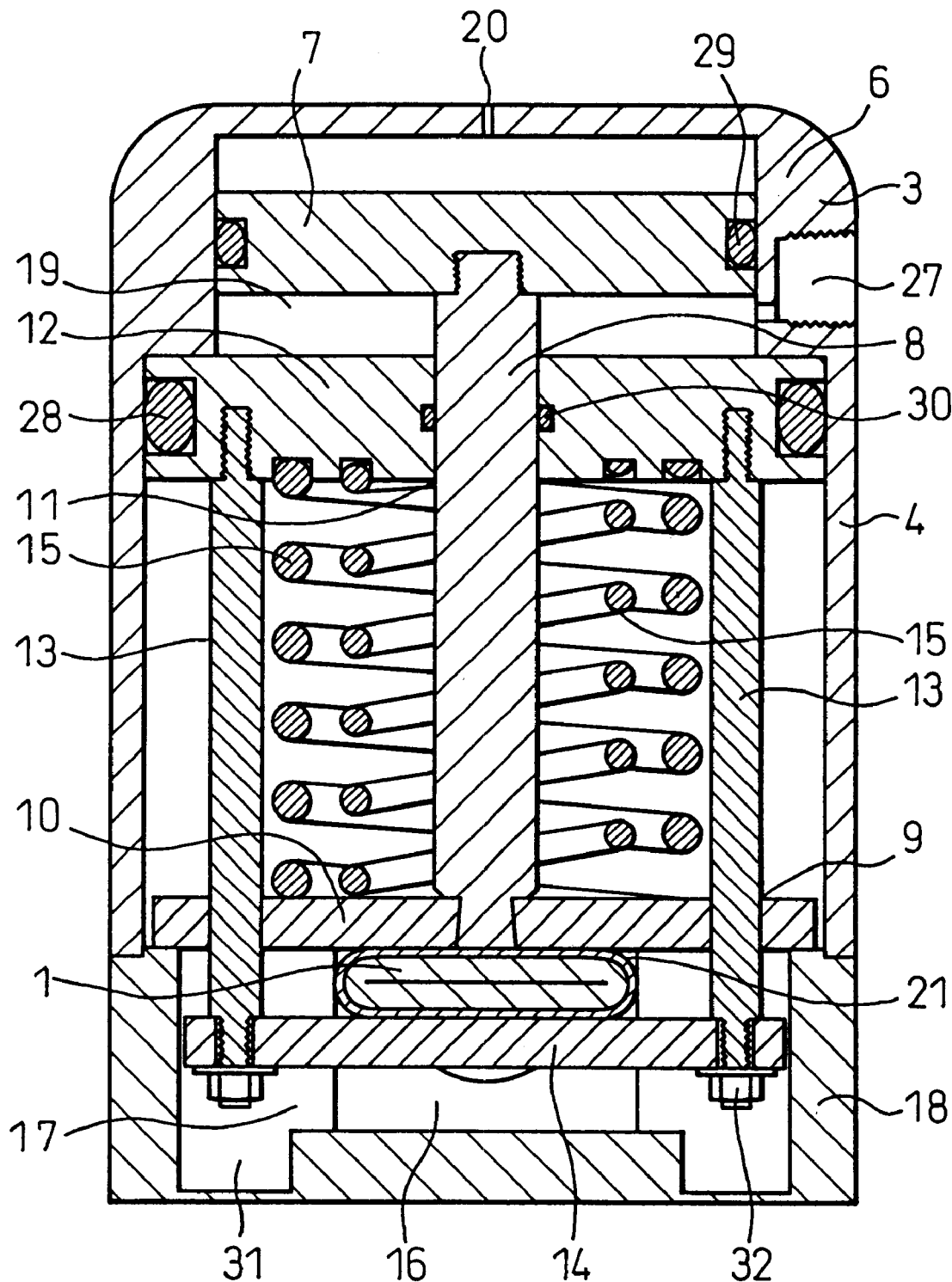
FIG. 1 is a longitudinal cross section showing the closed condition of an embodiment of the present invention viewing from the side (in the direction of the flow passage)

Embodiments of the present invention will be explained below with reference to the drawings.

FIGS. 1 to 5 show a first embodiment of the present invention, and reference numeral 1 designates a tube body which is made of a composition of PTFE and silicone rubber and in which a fluid flows. The tube body 1 is formed in an aimed thickness, for example, by adhering and laminating a multiple layers of PTFE sheets impregnated with silicone rubber. Also, reference numeral 21 designates a protecting portion made of EPDM, which is installed to enclose the whole outer periphery of the central region of the tube body 1.

In this embodiment, although the material of the tube body 1 is a composition of PTFE and silicone rubber, it may be EPDM, silicone rubber, fluororubber or a composition of these materials, and it is not especially limited. Similarly, although the material of the protecting portion 21 is EPDM, it is may be the other rubber elastic body such as CR. Also, regarding the installation of the protecting portion to the tube body 1, although it is installed to enclose the whole outer periphery of the center region, it may be provided on at least a site of the tube body 1 on which a first pressing piece 10 and a second pressing piece 14 abut.

Reference numeral 2 designates a coupling portion made of PFA, comprising a cap nut 24 made of PFA, which has a rectangular cross section, is fitted on the outer periphery of the end of the tube body 1, and is provided at the opposite end thereof with a female screw portion 26 with which a nipple 22 is screwed. The nipple 22 is inserted in the interior of the end of the tube body 1, and clips and fixes the end of the tube body 1 together with the cap nut 24 by screwing a male screw 25 provided on the outer periphery of the insertion side thereof with the female screw portion 26 of the cap nut 24. The nipple 22 is further provided, at the end thereof opposite to the end inserted in the tube body, with a female screw 23 for coupling the pinch valve in question, and has a flow passage therein. Further, in the embodiment, although the combination of the tube body 1 and the coupling portion 2 is designed such that the tube body 1 is gripped and held by the nipple 22 and the cap nut 24, the tube body 1 may be connected to the nipple 22 by hose bands etc., and thus the combining configuration is not especially limited. Also, although the configuration for coupling the pinch valve in question in the embodiment is the female screw portion 23 provided on the nipple 22, the nipple 22 may be provided with a male screw portion at the outer periphery thereof, and thus the configuration is not especially limited, if the nipple can be coupled with the pinch valve in question.

Reference numeral 6 designates a cylinder body made of PVC, which is provided with a first cylinder portion 3 having a cylindrical space at the upper inner portion thereof, with a second cylinder portion 4 having a cylindrical space with a diameter larger than that of the first cylinder portion 3 and following the first cylinder portion 3, and with a pair of rectangular cutout portions 5 at the lower end thereof in the direction of the flow passage, for receiving the coupling portions 2. Also, on the side of the cylinder body 6 is provided an air port 27 communicating a first space portion 19 enclosed by the lower end surface of the first piston 7, the upper end surface of the second piston 12 and the inner peripheral surface of the cylinder body 6 with a compressor (not shown) or the like in an outside air supply device. Further, on the upper surface of the cylinder body 6 is pierced an air port 20 communicating with the atmosphere.

The first piston 7 is formed as a disk, is made of PVC and is installed with an O-ring 29 on the outer peripheral side surface thereof, the first piston 7 sliding up and down on the inner peripheral surface of the first cylinder portion 3 in a sealing manner. The first pressing piece 10 is made of SUS, is formed as a bar having a semicylindrical cross-section, and the longitudinal dimension of it is larger than that of a guide slot 17 of a body 18. Also, the first pressing piece 10 is provided at respective locations thereof symmetrical in relation to the axis of the flow passage with first throughholes 9 through which each of second interlocking rods 13 penetrates, the first pressing piece 10 being fixed on the lower end of a first interlocking rod 8 provided on the first piston 7 to suspend from the center of the lower end surface of the first piston 7, by means of a rivet, such that the curved surface of the first pressing piece 10 is in contact with the tube body 1.

Reference numeral 12 designates a second disk-like piston installed with an O-ring 28 at the outer periphery thereof, which is made of PVC, the outer diameter of which is larger than that of the first piston 7, which has a second throughhole 11 installed with an O-ring 30 at the inner peripheral surface thereof and through which the first interlocking rod 8 fitted to the first piston 7 penetrates in a sealing manner, and which slides up and down on the inner peripheral surface of the second cylinder portion 4 in a sealing manner.

The second pressing piece 14 is fitted in the guide slot 17 of the body 18, is made of SUS, is formed as a bar with a semicylindrical cross-section, the second pressing piece 14 being screwed with the lower ends of second interlocking rods 13 which are fitted on both ends of the lower surface of the second piston 12 to suspend from the second piston 12 and which respectively penetrate two first through-holes 9 arranged on the sites of the first pressing piece 10 symmetrical in relation to the axis of the flow passage, by means of nuts 32, such that the curved surface of the second pressing piece 14 is in contact with the tube body 1 and the tube body 1 can be pressed from the upper and lower sides by the first and second pressing pieces 10 and 14.

Further, although the material of the first piston 7 and the second piston 12 is PVC in the embodiment, it may be another plastic or metal, and thus it is not especially limited. Also, although the material of the first pressing piece 10 and the second pressing piece 14 is SUS, it may be another metal. Moreover, although the material of the first interlocking rod 8 and the second interlocking rods 13 is SUS, it may be another metal or may be a plastic having a sufficient strength.

Reference numeral 15 designates two large and small spring elastic bodies made of SUS, which are pressed by the lower end surface of the second piston 12 and the upper end surface of the first pressing piece 10 and are installed in the cylinder body 6. In the embodiment, although the spring elastic body 15 is composed of two springs, the number of springs may be changed depending on the required urging force. Also, a metallic disk-like plate (not shown) may be provided between the lower end surface of the spring elastic body 15 and the upper surface of the first pressing piece so that the urging force of the spring elastic body 15 can be more uniformly transmitted to the first pressing piece 10 and the second piston 12. Further, although the material of the spring elastic body 15 is SUS in the embodiment, it may be SUS coated with PTFE etc. if necessary.

The body 18 is made of PVC, and is provided with a groove 16 having a rectangular cross-section on the axis of the flow passage and with the guide slot 17 the longitudinal dimension of which is shorter than that of the first pressing piece 10 on a location perpendicularly intersecting the axis of the flow passage in the center of the groove 16. Also, the bottoms of both ends of the guide slot 17 are provided with cylindrical grooves 31. In the groove 16 is installed the tube body 1 to which the coupling portions 2 are fixed, so that the cap nuts 24 constituting the coupling portions 2 are clipped and fixed on both ends of the tube body by the body 18 and the cutout portions 5 of the cylinder body 6. Also, in the guide groove 17 are inserted the respective second interlocking rods 13 and is fitted the second pressing piece 14 to enable to move up and down. Further, in the cylindrical grooves 31 are enclosed nuts 32 screwed to the lower ends of the second interlocking rods 13 when the valve is opened.

As explained in the above description, in the pinch valve of the embodiment, the whole height becomes small and it is compact in comparison with the conventional pinch valve, since the configuration does not require the leg member, the leg stand and the wing piece between the drive portion and the valve body as in the conventional pinch valve. Here, if the height of the pinch valve in the embodiment is compared with that of the conventional pinch valve, when the bore diameter is 25 mm, the height of the pinch valve according to the invention is merely 140 mm in relation to 371 mm height of the conventional pinch valve, and thus the height dimension of the inventive pinch valve is approximately $1/2.5$ in comparison with that of the conventional pinch valve and thus the pinch valve according to the invention is remarkably compact.

Further, concerning the protection of the tube body 1, since the configuration of the embodiment does not directly press the flow passage portion by the pressing pieces as in the conventional pinch valve, but the tube body 1 is protected by the protecting portion 21, the tube body 1 is not likely to degrade and thus the durability of the pinch valve can be extended. Here, if the durability of the pinch valve of the embodiment in which the tube body 1 is protected by the protecting portion 21 is compared with that of the conventional pinch valve in which the flow passage portion is directly clipped by the pressing pieces, in the number of times of long term opening and closing tests of the respective pinch valves, when the bore diameter is 25 mm, the conventional pinch valve was damaged in the flow passage portion at 700,000 times of opening and closing, whereas the embodiment was normal even at 1,400,000 times, the durability of the tube body 1 according to the embodiment was rapidly improved and thus the durability of the pinch valve according to the embodiment was remarkably extended.

Further, if the tube body 1 is made of a composition of PTFE and silicone rubber, particles from the inner peripheral surface of the tube body 1 due to opening and closing the tube body are fewer than from the other rubber elastic body. Thus, if this tube body is used for the fluid pipeline in the semiconductor industrial field in which, in particular, the particles affect the yield of the products, remarkable effects can be obtained.

The operation of the pinch valve of the embodiment constituted as above will be described as follows.

In the fully closed condition as shown in FIG. 1, when a pressurized air is pressed into the first space 19 from the air port 27, first the second piston 12 the diameter of which is larger than that of the first piston 7 and thus which has a larger pressure receiving area begins to go down, with the side peripheral surface thereof sliding on the inner peripheral surface of the second cylinder portion 4 and with the spring elastic body 15 being compressed, as a, result, the second pressing piece 14 screwed with the lower ends of the second interlocking rods 13 suspending from the second piston 12, by the nuts 32 lowers in the guide slot 17. Finally, the second pressing piece 14 arrives at the bottom of the groove 16 and the lowering of the second piston 12 is completed. At the same time, the first piston 7 is raised, with the side peripheral surface thereof sliding on the inner peripheral surface of the first cylinder portion 3, by the air pressure in the first space 19, and the air stagnated in the space enclosed by the upper end surface of the first piston 7 and the inner peripheral surface of the cylinder body 6 is discharged from the air port 20. As a result, the first pressing piece 10 fixed to the lower end of the first interlocking rod 8 suspending from the first piston 7 is raised in the second cylinder portion 4. Finally the first piston 7 arrives at the upper end surface of the interior of the first cylinder portion 3 of the cylinder body 6, the raising of the first piston 7 is stopped and the pinch valve becomes a fully opened condition (the condition of FIG. 2).

Figure 2:
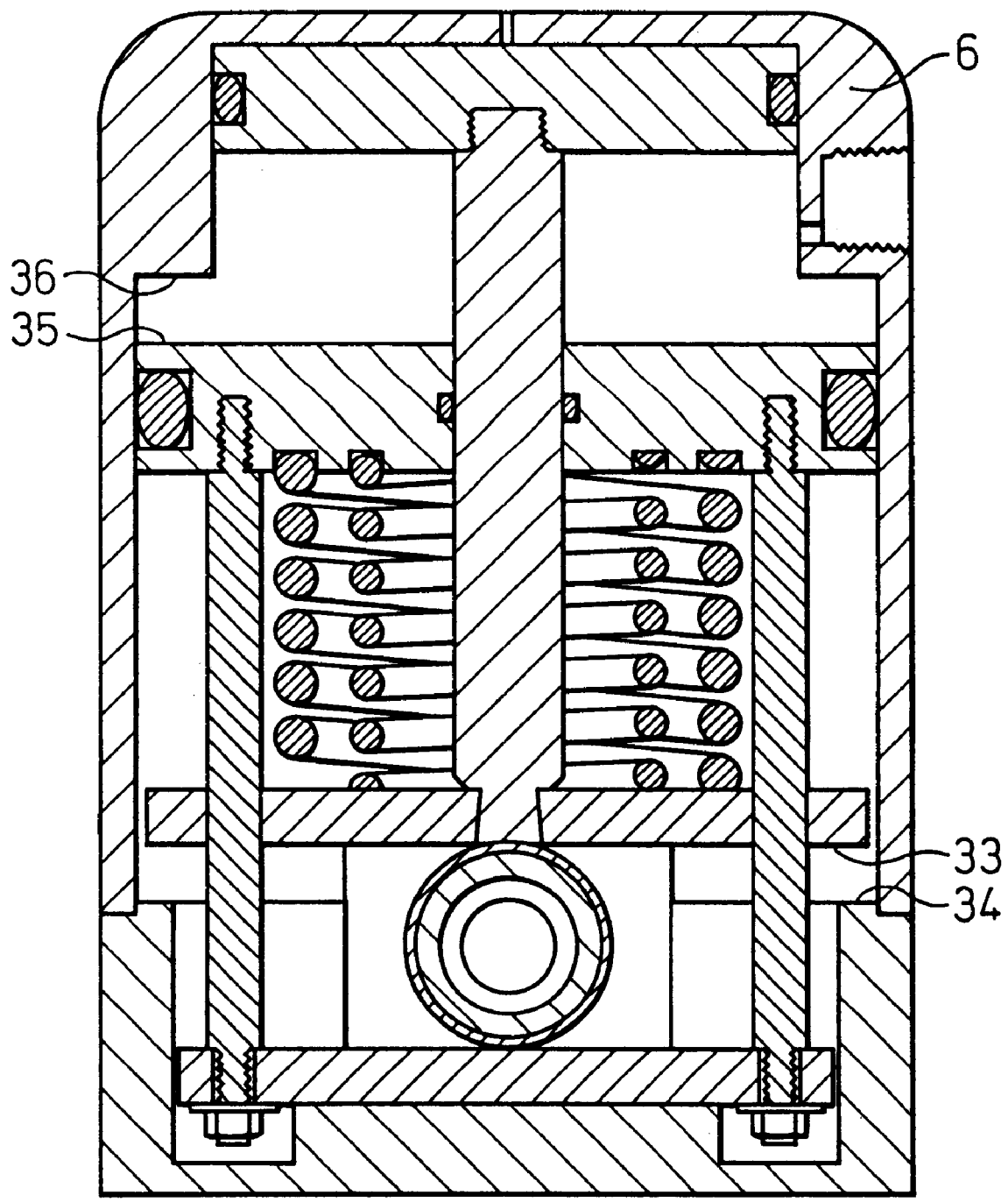
FIG. 2 is a longitudinal cross section showing the opened condition of FIG. 1.
Figure 3:
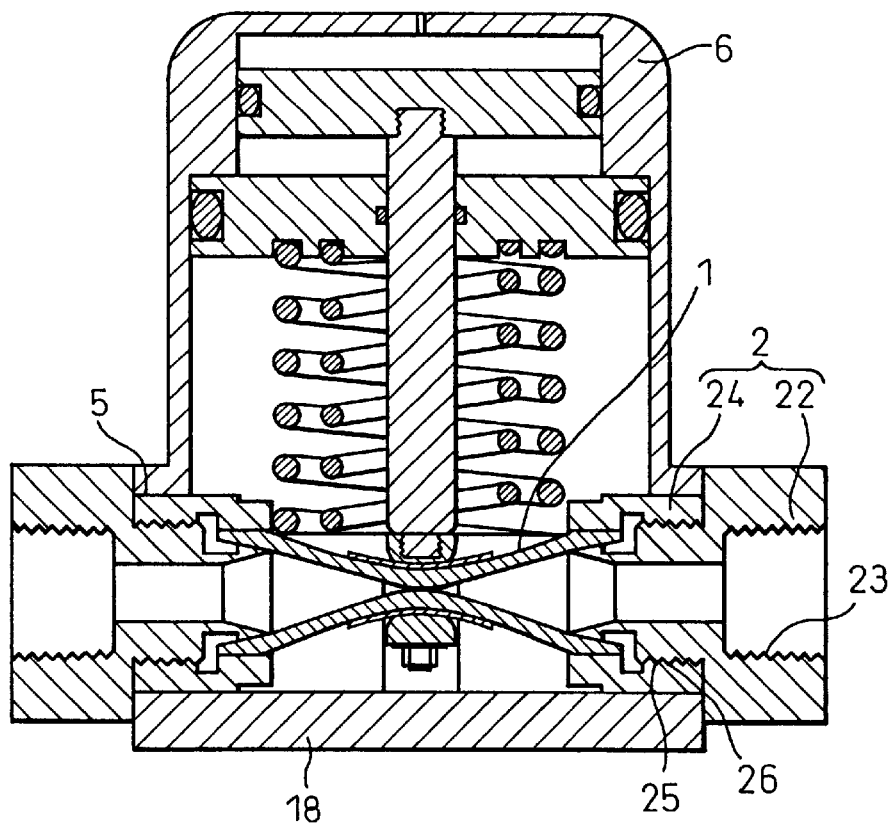
FIG. 3 is a longitudinal cross section viewing FIG. 1 from the front.
Figure 4:
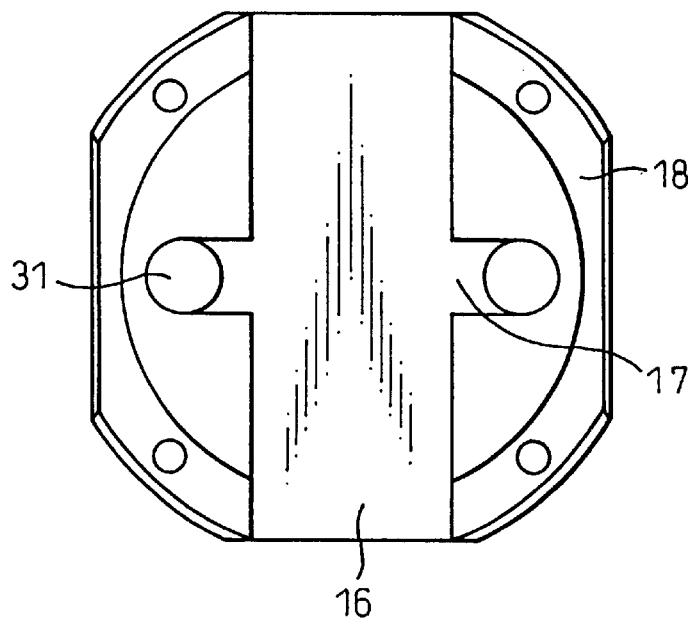
FIG. 4 is a plan view of the body in FIG. 1.
Figure 5:
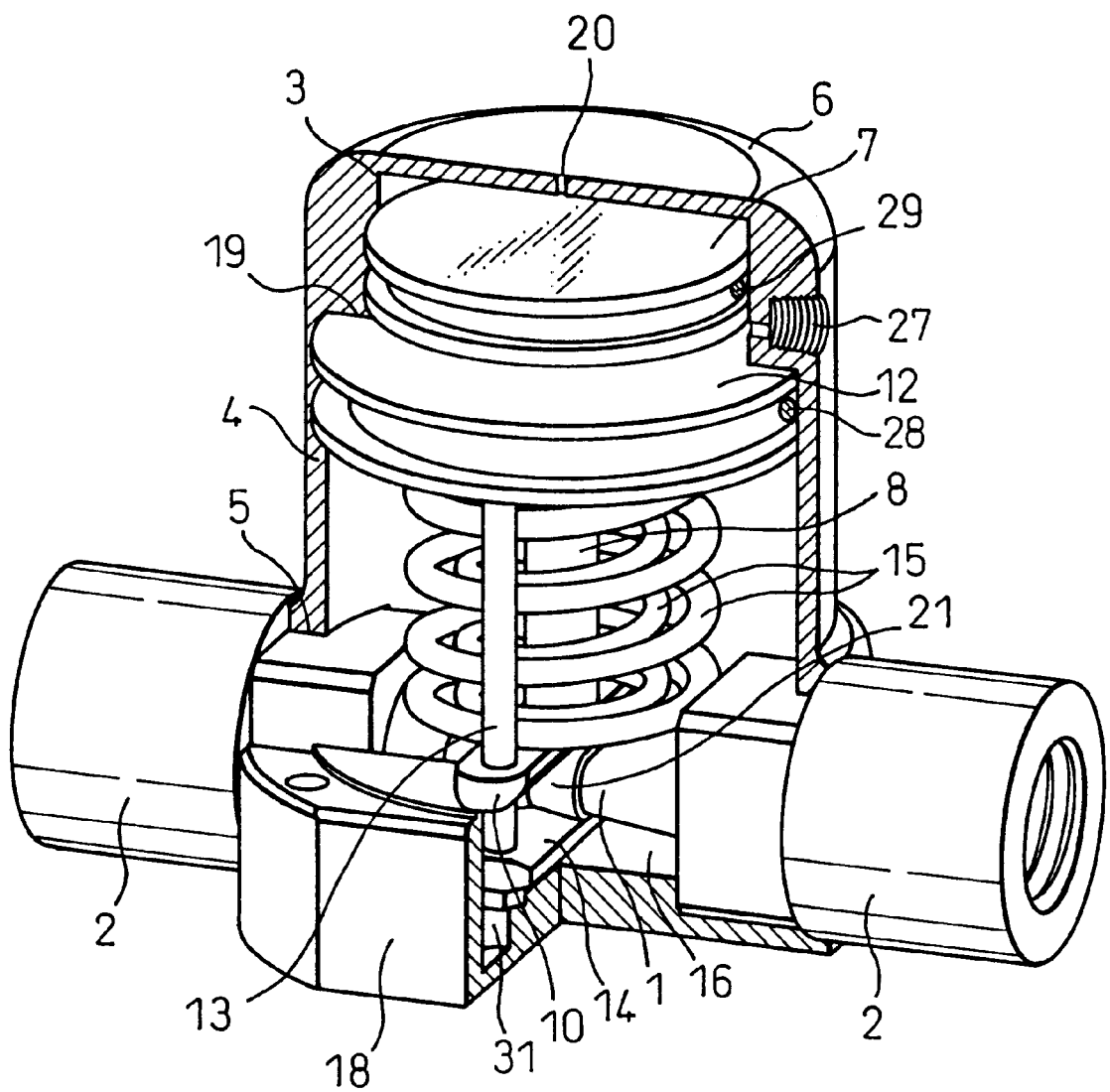
FIG. 5 is a perspective view of FIG. 1 which is partially cut out.

Then, in the fully opened condition of the pinch valve shown in FIG. 2, when the supply of the air from the air port 27 to the first space 19 is stopped and the air is discharged to the atmosphere, the first pressing piece 10 abutting on the spring elastic body 15 is lowered by the force of the spring elastic body 15, the first pressing piece 10 presses the tube body 1 from the upper side and the lowering of it is stopped, with the lower end portions 33 of both ends abuttingon the upper end 34 of the body 18. At the same time, the second piston 12 abutting on the upper end of the spring elastic body 15 is raised until the upper end peripheral portion 35 of the second piston 12 abuts on the upper end peripheral portion 36 in the second cylinder portion 4 by the force of the spring elastic body 15, with the side peripheral surface of the second piston 12 sliding on the inner periphery of the second cylinder portion 4. As a result, due to the raising of the second pressing piece 14 screwed with the lower ends of the second interlocking rods 13 suspending from the second piston 12 by the nuts 32, the first pressing piece 14 pressed the tube body 1 together with the first pressing piece 10 so that the pinch valve according to the invention becomes the fully closed condition (the condition shown in FIG. 1).

Then, a second embodiment of the pinch valve according to the invention will be explained on the basis of FIGS. 6 to 10.

Reference numeral 46 designates a cylinder body, which is provided with a circular opening portion 38 at the upper portion thereof. Since the configuration of the other portions of the cylinder body 46 is the same as that of the cylinder body 6 in the first embodiment, the explanation of it will be eliminated.

Reference numeral 37 designates a first piston made of PVC, which is integrally provided with a male screw portion 41 projecting from and penetrating the opening portion 38 of the upper portion of the first piston, for adjusting the opening degree of the pinch valve. Although the male screw portion 41 for adjusting the opening degree is integrally provided on the upper portion of the first piston 37 and projects from the opening portion 38, it may be integrally molded together with the first piston 37, or a separate male screw portion 41 may be adhered to or screwed with the first piston 37, and thus the providing procedure of the male screw portion 41 for adjusting the opening degree is not especially limited. Since the configuration of the other portions of the first piston 37 is the same as that of the first embodiment, the explanation of it will be eliminated.

Reference numeral 39 designates a stopper made of PVC, the whole of which is generally a doughnut shape, which is provided at the lower portion thereof with a recess 47 fitted on the upper portion of the cylinder body 46 and with female screw portion 43 at the inner periphery of a central hole 42 of the stopper 39, and which is screwed with the adjusting male screw portion 41, with the lower end of the stopper 39 being pressed on and separated from the upper end surface of the cylinder body 46.

Reference numeral 40 designates a lock nut made of PVC, which is provided with a recess 45 having a male screw portion 44 on the inner periphery thereof, and which is screwed with the upper portion of the adjusting male screw portion 41 in the condition where the lock nut 40 is pressed on the upper end surface of the stopper 39.

Since the configuration of the other members of the pinch valve according to the second embodiment is the same as that of the first embodiment, the explanation of it will be eliminated.

Next, the method of adjusting the intermediate opening degree of the pinch valve will be explained.

Figure 6:
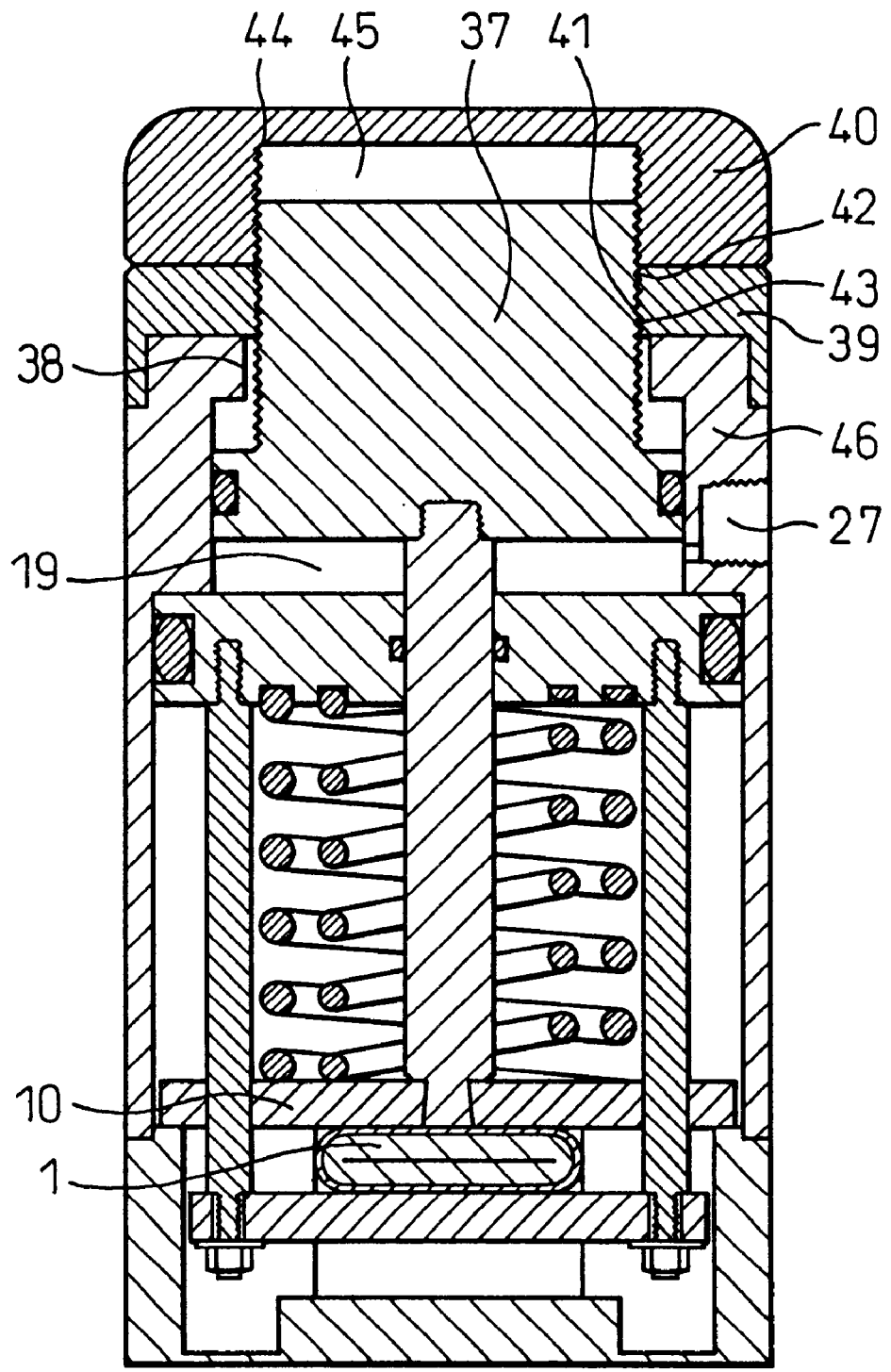
FIG. 6 is a longitudinal cross section showing the closed condition of a second embodiment of the pinch valve according to the invention viewing from the side (in the direction of the flow passage)
Figure 7:
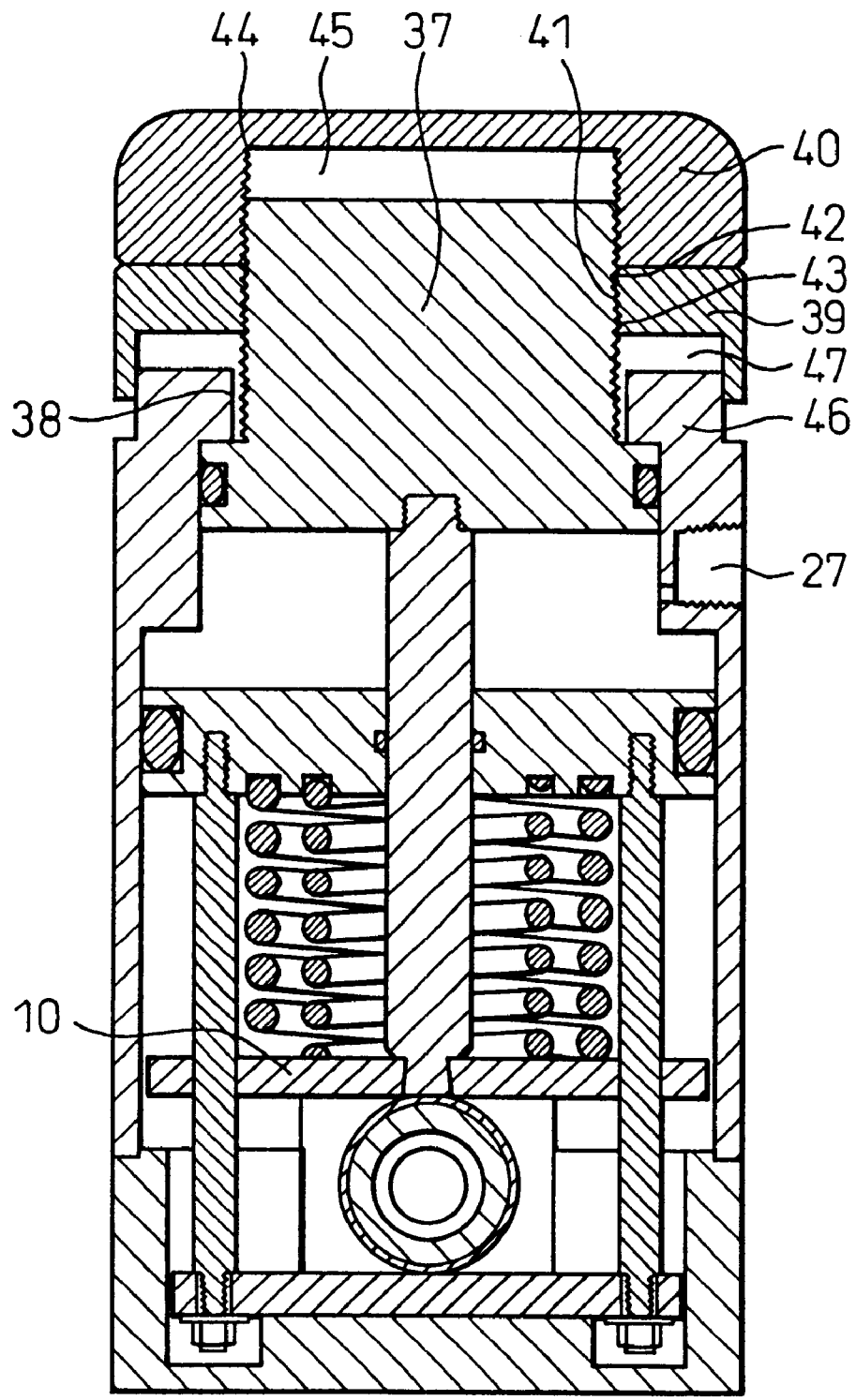
FIG. 7 is a longitudinal cross section showing the opened condition of FIG. 6.
Figure 8:
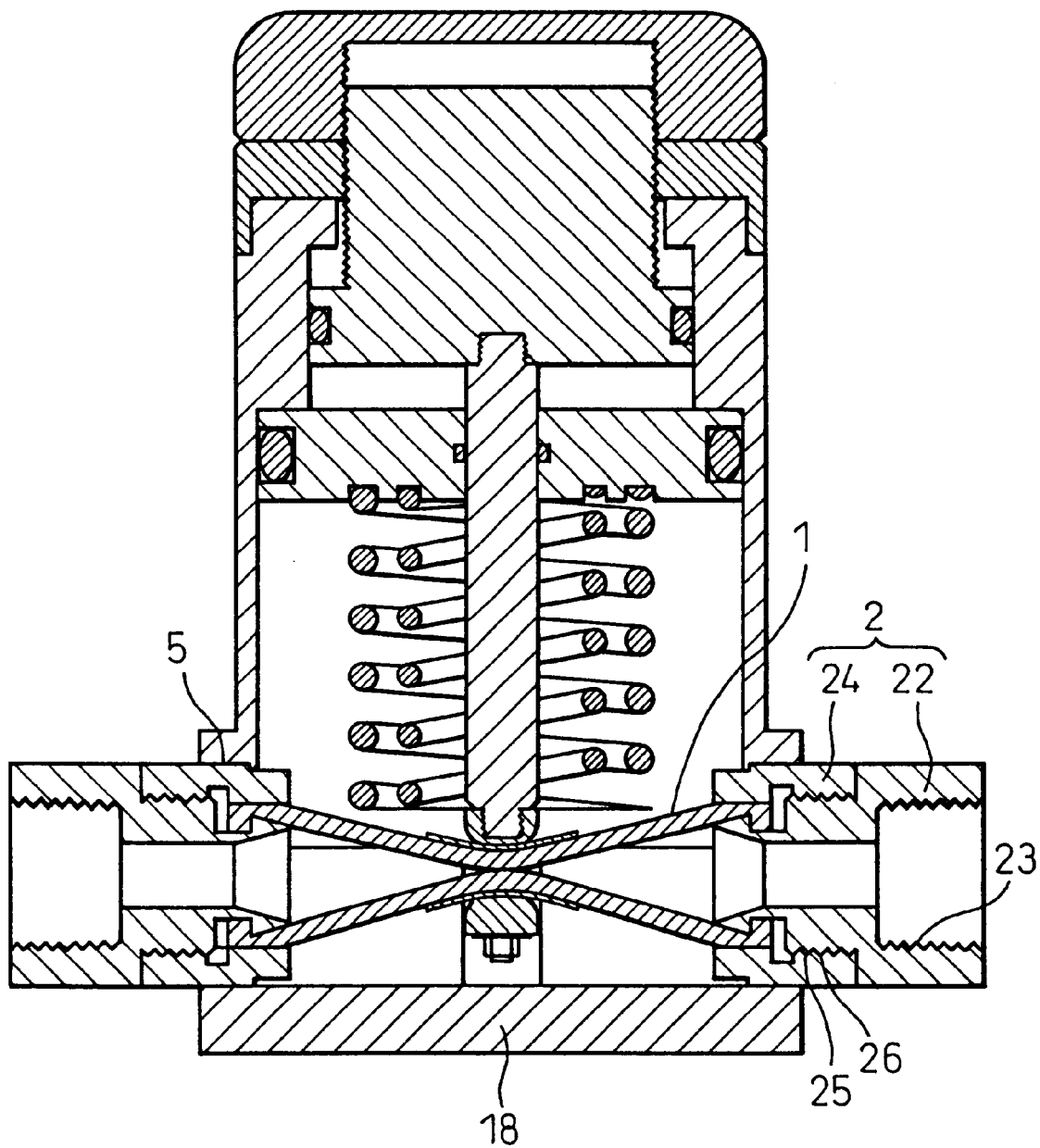
FIG. 8 is a longitudinal cross section viewing FIG. 6 from the front.

In the condition shown in FIGS. 6 and 8, i.e., the fully closed condition, an operator first rotates only the lock nut 40 to be loosed and separated from the upper end surface of the stopper 39. Then, the operator rotates the stopper 39 to draw up the first piston 37 as well as to draw up the first pressing piece 10 connected to the first piston 37, so that the tube body 1 is brought from the closed condition to the intermediate opened condition (the condition in FIGS. 9 and 10). The operator further rotates the stopper 39 to finely adjust the opening degree of the tube body 1. After the opening degree is determined, the operator rotates the lock nut 40 reversely to clamp it to be pressed on the upper end surface of the stopper 39. In this way, the adjustment of the intermediate opening degree of the pinch valve is completed.

Figure 9:
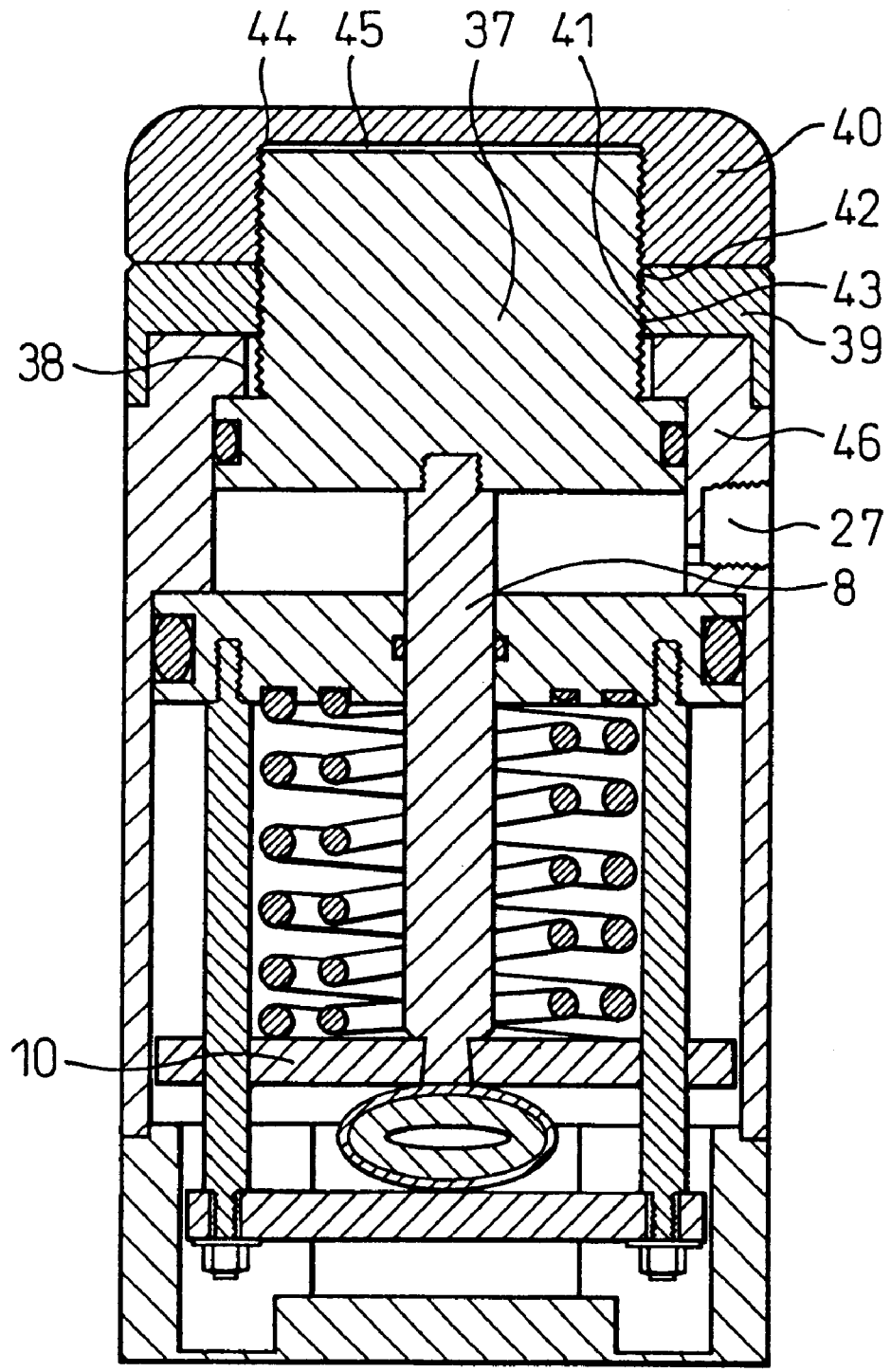
FIG. 9 is a longitudinal cross section showing the intermediately opened condition of FIG. 6.
Figure 10:
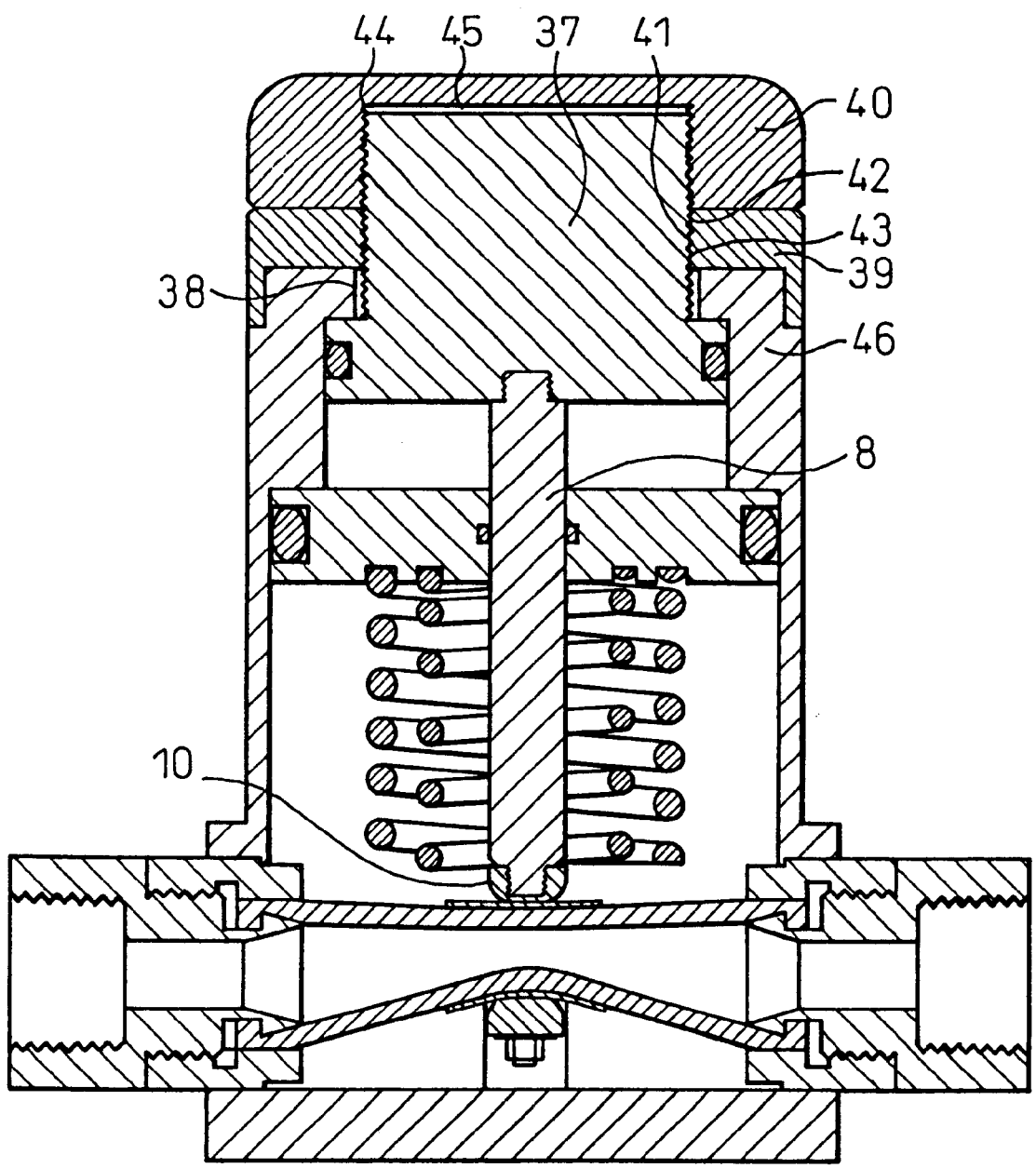
FIG. 10 is a longitudinal cross section of FIG. 9 viewing from the front.
Figure 11:
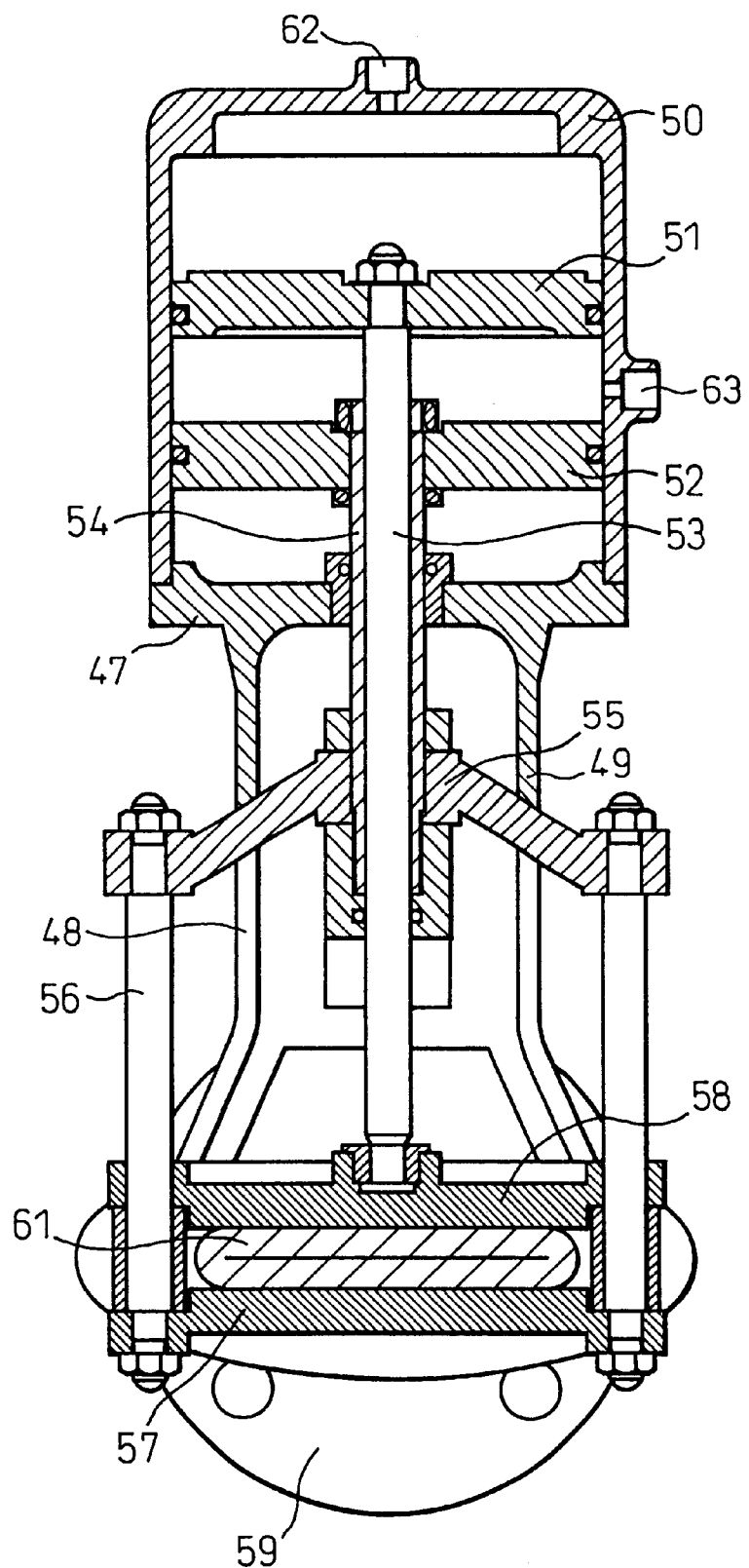
FIG. 11 is a longitudinal cross section showing the closed condition of the conventional pinch valve viewing from the side (in the direction of the flow passage)
Figure 12:
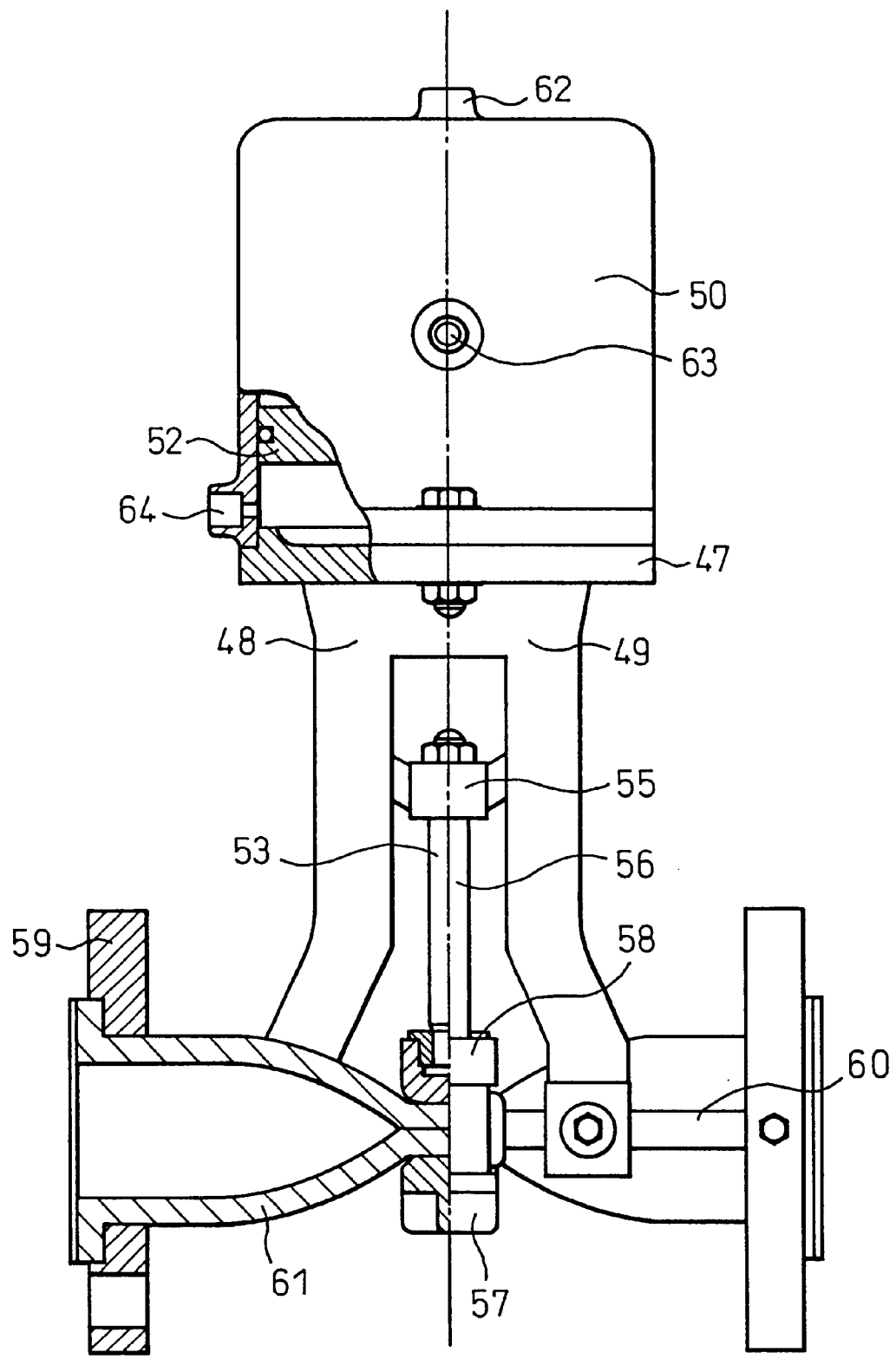
FIG. 12 is a partial longitudinal cross section of FIG. 11 viewing from the front.

In the condition shown in FIGS. 9 and 10, i.e., the intermediate opened condition, when a pressurized air is supplied to be pressed into the space 19 from the air port 27 similarly to the operation of the first embodiment, the pinch valve is brought into the fully opened condition.

Then, in the fully opened condition of the pinch valve, when the supply of the air from the air port 27 to the first space 19 is stopped and the space 19 is opened to the atmosphere, the pinch valve is brought into the intermediate opened condition (the condition in FIGS. 9 and 10). Thereafter, the operator first rotates only the lock nut 40 to be loosed to separate it from the upper end surface of the stopper 39. Then, when the operator rotates the stopper 39 reversely in relation to the adjustment of the intermediate opening degree, the first piston 37 is drawn down as well as the first pressing piece 10 connected to the first piston 37 is lowered to press the tube body 1 from the upper side, and finally the tube body 1 is fully closed (the condition in FIGS. 6 and 8). Thereafter, the operator rotates the lock nut 40 reversely to clamp it to be pressed on the upper end surface of the stopper 39.

In the intermediate opened condition (the condition in FIGS. 9 and 10), when an pressurized air is supplied to be pressed into the space 19 from the air port 27, similarly to the operation of the first embodiment, the pinch valve is brought into the fully opened condition.

In the pinch valve according to this embodiment, since it has the above configuration, it is able to pass the fluid at an intermediate opening degree of the tube body. Therefore, the pinch valve can be used as a back pressure valve in a closed loop pipe line of a semiconductor manufacturing apparatus, and can maintain a minimum pressure without lowering the pressure at the use point.

The present invention attains the following excellent effects because it has the above-mentioned configuration.

1. Since the whole height of the pinch valve is low in comparison with the conventional pinch valve and the pinch valve is compact, a large space for a pipeline is not required. Thus, it is possible to couple it to a semiconductor manufacturing apparatus in which a complicated pipeline is designed, consequently making the manufacturing apparatus compact can be performed.

2. If a protecting portion is installed on the tube body, the durability of the tube body is improved and, consequently, the life of the pinch valve can be remarkably extended.

3. Since the opening degree of the pinch valve can be adjusted, a fine flow rate of fluid is possible.

What is claimed is:

1. A pinch valve comprising a body containing an elastic tube body which constitutes a flow passage for fluid; a cylinder body joined to the upper portion of the body at the lower end thereof and having a first cylinder portion in the upper portion of the interior thereof and a second cylinder portion with a diameter larger than that of the first cylinder portion in the lower portion of the interior thereof; a first piston sliding up and down on the inner peripheral surface of the first cylinder portion; and a second piston sliding up and down on the inner peripheral surface of the second cylinder portion; wherein the first piston is installed with a first interlocking rod suspending from the center of the lower surface thereof, penetrating the second piston and having a first pressing piece at the lower end of the first interlocking rod, the second piston is installed with second interlocking rods suspending from both ends of the lower surface thereof, penetrating the first pressing piece and having a second pressing piece at the lower ends of the second interlocking rods, the first and second pressing pieces are arranged to press the elastic tube body from the upper and lower sides, a spring elastic body urging the first pressing piece is disposed between the second piston and the first pressing piece, and an opening portion communicating with a space portion enclosed by the lower end surface of the first piston, the upper end surface of the second piston and the inner peripheral surface of the cylinder body is provided on the cylinder body.

2. A pinch valve, as set forth in claim 1, wherein a pair of coupling portions are connected to both ends of the tube body.

3. A pinch valve, as set forth in claim 2, wherein a pair of cutout portions receiving the pair of coupling portions are provided on the lower end portion of the cylinder body in the direction of the flow passage.

4. A pinch valve, as set forth in claim 2, wherein the body is provided with a groove receiving the tube body and the coupling portions on the axis of the flow passage.

5. A pinch valve, as set forth in claim 1, wherein a guide slot in which the second pressing piece is fitted to enable to move up and down is provided in the body at the location intersecting the axis of the flow passage.

6. A pinch valve, as set forth in claim 1, wherein a groove receiving the tube body and the coupling portions is provided in the body on the axis of the flow passage.

7. A pinch valve, as set forth in claim 5, wherein the dimension of the first pressing piece in the direction perpendicularly intersecting the axis of the flow passage is larger than that of the guide slot.

8. A pinch valve, as set forth in claim 1, wherein the first pressing piece is provided with first through-holes penetrated by the second interlocking rods at the locations symmetrical in relation to the axis of the flow passage, and the second piston is provided at the center thereof with a second through-hole on which the first interlocking rod slides in a sealing manner.

9. A pinch valve, as set forth in claim 1, wherein the tube body is provided with a protecting portion at the outer peripheral surface thereof.

10. A pinch valve, as set forth in claim 1, wherein a material of the tube body is EPDM, fluororubber, silicone rubber, or a composite of these materials.

11. A pinch valve, as set forth in claim 1, wherein the tube body is made of a composite of polytetrafluoroethylene and rubber elastic body.

12. A pinch valve, as set forth in claim 1, wherein the cylinder body is provided at the upper surface thereof with an opening portion, the first piston is provided at the upper portion thereof with a male screw portion for adjusting an opening degree of the tube body, said male screw portion penetrating the opening portion of the cylinder body and integrally projecting from the first piston, and a stopper pressed on and separated from the upper end surface of the cylinder body at the lower end surface of the stopper and a lock nut pressed on the upper end surface of the stopper are rotatably screwed with the male screw portion for adjusting the opening degree.

\* \* \* \* \*